(12) United States Patent
Sorensen

(10) Patent No.: US 6,384,876 B1
(45) Date of Patent: May 7, 2002

(54) VERTICALLY CONFIGURED VIDEO PROJECTION SYSTEM

(75) Inventor: Tom L. Sorensen, Naperville, IL (US)

(73) Assignee: Zenith Electronics Corporation, Lincolnshire, IL (US)

( * ) Notice: Subject to any disclaimer, the term of this patent is extended or adjusted under 35 U.S.C. 154(b) by 0 days.

(21) Appl. No.: 08/353,413

(22) Filed: Dec. 9, 1994

(51) Int. Cl.[7] .......................... H04N 5/655; H04N 9/16; H04N 3/22; H04N 5/64
(52) U.S. Cl. ................. 348/829; 348/744; 348/745; 348/778; 348/787; 348/805; 348/806
(58) Field of Search .................. 348/829, 744, 348/776, 778, 787, 805, 830, 739, 745, 806; 313/2.1

(56) References Cited

U.S. PATENT DOCUMENTS 4,352,124 A  *  9/1982  Kline ........................ 348/744

* cited by examiner

Primary Examiner—Kimberly A. Williams

(57) ABSTRACT

A video projector is arranged with three color CRTs vertically aligned with respect to a forwardly located projection surface. The projection surface is in a room having opposite side walls on either side of said projection surface. The video projector is positioned closely adjacent either of said side walls, thus leaving the ceiling and floor areas of the room unobstructed. The arrangement facilitates non intrusive use of a video projector in a home environment.

4 Claims, 1 Drawing Sheet

VERTICALLY CONFIGURED VIDEO PROJECTION SYSTEM

BACKGROUND OF THE INVENTION AND PRIOR ART

This invention relates generally to video projection systems and particularly to video projection systems for use in the home. A major impediment to the growth of home video projection systems is that the projector must be secured to a ceiling or be "floor mounted", i.e. be configured as a coffee table or the like. A ceiling mounting arrangement often entails difficulties that require outside assistance, whereas a floor mounted projector obstructs the area of the floor in front of the projection or viewing surface. Additionally, the video projector requires electrical power connections as well as video and audio cabling, all of which create a tripping hazard in a floor installation and a routing problem in a ceiling installation. The present invention, involving a non intrusive video projector design, solves these problems.

OBJECTS OF THE INVENTION

A principal object of the invention is to provide an improved video projection system.

Another object of the invention is to provide a non intrusive video projection system that is more easily adapted to a room environment.

BRIEF DESCRIPTION OF THE DRAWING

These and other objects and advantages of the invention will be apparent upon reading the following description in conjunction with the drawing, in which.

DESCRIPTION OF THE PREFERRED EMBODIMENT

Figure 1:
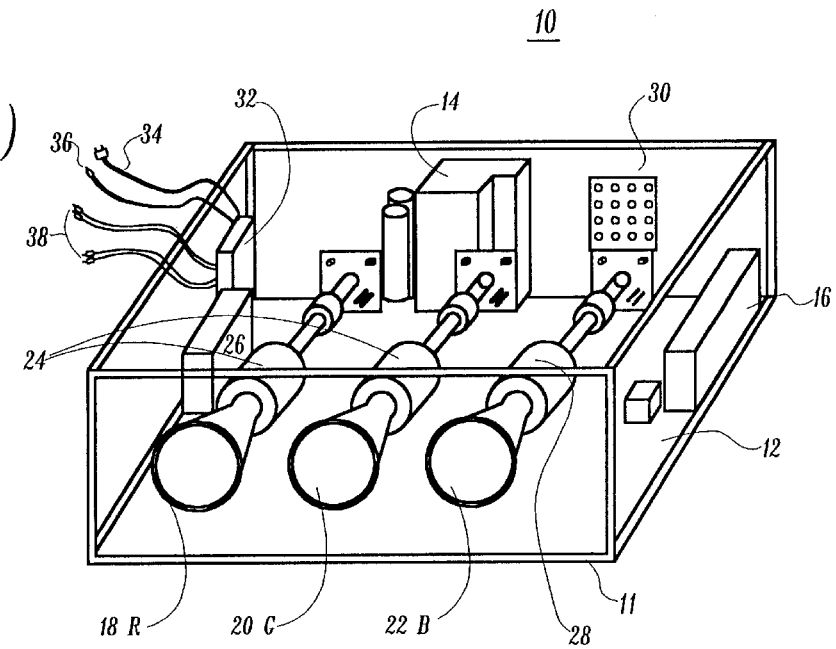
FIG. 1 is a generalized mechanical view of a video projector of the prior art.

Referring to FIG. 1, a video projector 10 generally includes a relatively rigid frame arrangement 11 for supporting a printed circuit (PC) board chassis 12, a power supply 14 and a deflection module 16. Other components required for a video (and/or television) system are also included on the PC board chassis 12 or are mounted to the frame 11 and connected to the chassis 12, as is well known in the art. Three projection cathode ray tubes (CRTs) 18, 20 and 22 are physically secured to the frame 11 in a well known manner (not shown) and arranged to have the two outboard tubes slightly inwardly directed so that a converged image is developed on a projection surface that is located forwardly of the CRTs. Deflection yokes 24, 26 and 28 are positioned on the necks of CRTs 18, 20 and 22, respectively, and are connected by suitable leads to deflection module 16. A convergence circuit board 30, with a plurality of convergence controls mounted thereon, is for establishing convergence of the individual video displays produced by the three CRTs 18, 20 and 22. A connection board 32 provides external connectability for an AC power line 34, a video cable 36 and one or more audio cable pairs 38, as required. It will be appreciated that video projection systems have been in the art for a number of years and are well known. Such systems in general are included in a decorative cabinet and may be set up for floor mounting or arranged to be supported by a suitable ceiling mount. Changes in the deflection yoke connections are required for the different mounting arrangements.

Figure 2:
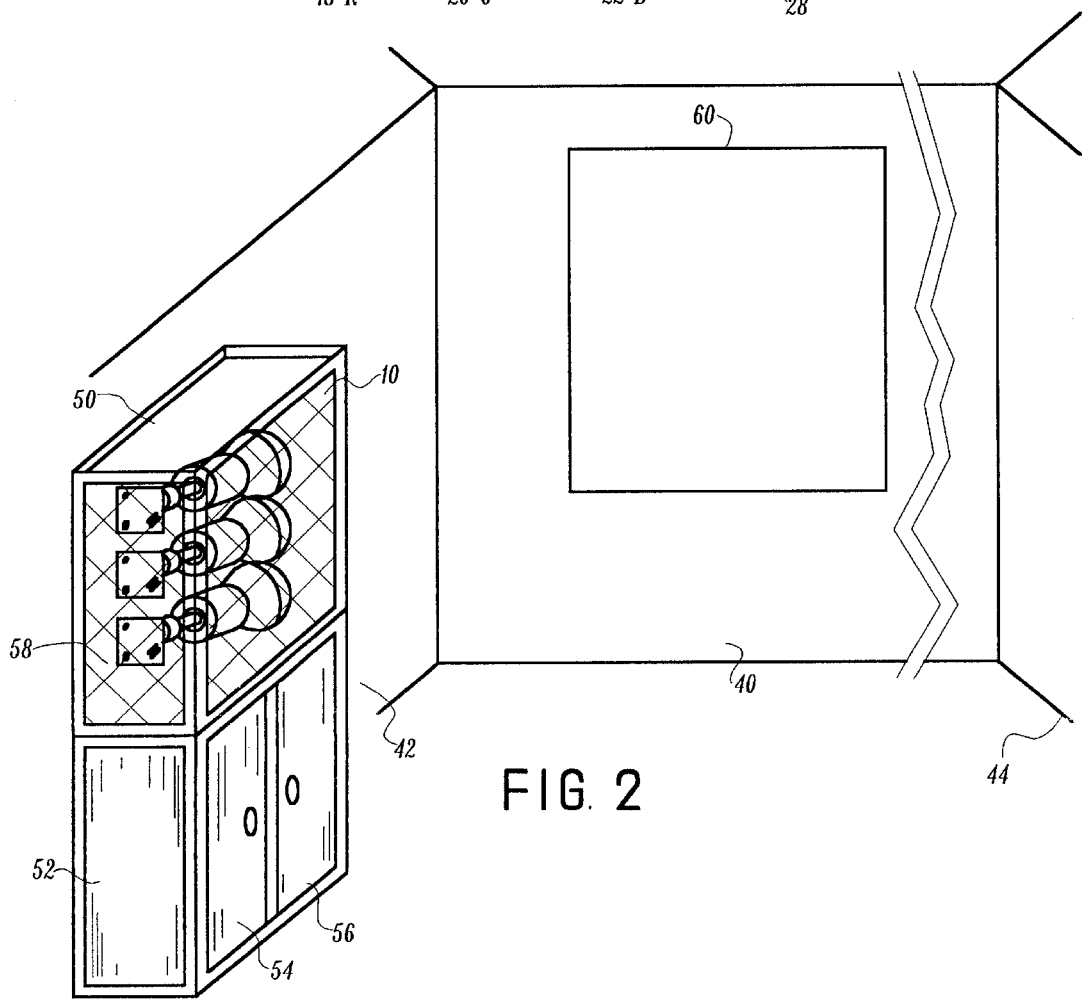
FIG. 2 shows the video projector of the invention mounted in a cabinet.

In FIG. 2, projector 10 is shown mounted in accordance with the invention with the three CRTs 18, 20 and 22 in vertical alignment. The frame 11 is secured within a suitable cabinet 50 which may conveniently rest on a pedestal base 52 having cabinet doors 54 and 56 for enabling access to the inside thereof. The projection surface 60 may comprise a blank, light-colored wall 40 of a room having opposite side walls 42 and 44 that are generally perpendicularly arranged thereto. Obviously, the projection surface 60 may also comprise a highly reflective screen which could be a "pull-down" movie screen. As seen in FIG. 2, the projection system is mounted off to one side of the projection surface. Specifically, it is adjacent to left wall 42 and the yokes on the necks of the CRTs have been rotated 90 degrees to enable a horizontal video display from the vertically oriented CRTs. It will be appreciated that video display devices or projectors have raster correction controls for correcting raster geometry distortions, such as keystone, pincushion, "S" and the like, that result from the offset projection axes of the three CRTs. These controls are adjusted to produce a straight-sided rectangular video display as illustrated by projection surface 60. It will also be appreciated by those skilled in the art that while the illustrated projection system is set up for a left side mounting arrangement, it may be readily set up for mounting adjacent the opposite room wall by suitable changes in connections on the deflection yokes and resetting some of the raster correction controls. This is very much like the changes that are now required when converting between ceiling and floor installations and are well within the skill of the art. It should be particularly noted that the floor and ceiling areas in front of projection surface 60 are clear of any obstruction.

What has been described is a novel video projection system that enables such systems to have widespread use in home environments since the clutter of a floor mounted unit or the difficult installation of a ceiling mounted unit has been avoided. It is recognized that numerous changes in the described embodiment of the invention will be apparent to those skilled in the art without departing from its true spirit and scope. The invention is to be limited only as defined in the claims.

What is claimed is:

1. A video projection system comprising:

a housing;

a video chassis in said housing;

three video projection CRTs in said housing;

means on said video chassis for developing deflection signals for each of said CRTs;

individual yokes mounted on the necks of said CRTs; and means supporting said housing with said CRTs vertically aligned, said yokes being positioned on said necks such that an offset horizontal display is produced on a projection surface positioned forwardly of said vertically aligned CRTs.

2. The system of claim 1 wherein said projection surface is in a room that includes a side wall that is substantially perpendicular to said projection surface, said housing being positioned closely adjacent said side wall.

3. The video projection system of claim 2 further including a cabinet containing said housing.

4. A video projection system comprising:

a cabinet;

a housing in said cabinet;

a video chassis in said housing;

three projection CRTs in said housing;

means on said video chassis for developing deflection signals for each of said CRTs;

individual yokes mounted on the necks of said CRTs;

said cabinet supporting said housing with said CRTs vertically aligned, said yokes being positioned on said necks such that an offset horizontal display is produced on a projection surface located forwardly of said vertically aligned CRTs, said projection surface being in a room having opposite side walls on either side of said projection surface; and said cabinet being positioned closely adjacent either of said side walls.

* * * * *